(12) United States Patent
Currier

(10) Patent No.: US 11,473,270 B2
(45) Date of Patent: Oct. 18, 2022

(54) SYSTEM AND METHOD FOR ASSISTING REMOTE OPERATION OF A WORK MACHINE

(71) Applicant: Caterpillar Inc., Peoria, IL (US)

(72) Inventor: Shaun D. Currier, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 87 days.

(21) Appl. No.: 16/987,896

(22) Filed: Aug. 7, 2020

(65) Prior Publication Data
US 2022/0042278 A1    Feb. 10, 2022

(51) Int. Cl.
| E02F 9/20 | (2006.01) |
| E02F 9/26 | (2006.01) |
| G05D 1/00 | (2006.01) |

(52) U.S. Cl.
CPC ........... *E02F 9/205* (2013.01); *E02F 9/26* (2013.01); *G05D 1/0016* (2013.01); *G05D 1/0022* (2013.01); *G05D 2201/0202* (2013.01)

(58) Field of Classification Search
CPC .......... E02F 9/205; E02F 9/26; G05D 1/0016; G05D 1/0022; G05D 2201/0202
USPC ........................................................... 701/2
See application file for complete search history.

(56) References Cited

U.S. PATENT DOCUMENTS

| 9,657,567 | B2 | 5/2017 | Malayappalayam Shanmugam et al. |
| 10,118,553 | B2 | 11/2018 | Matsuo et al. |
| 10,600,325 | B1* | 3/2020 | Songa ............... G08G 5/025 |
| 2017/0016211 | A1* | 1/2017 | Arimatsu ............ G01S 19/14 |
| 2017/0344128 | A1* | 11/2017 | Pasquero ........... G06F 3/0237 |
| 2019/0101641 | A1 | 4/2019 | Hogan et al. |
| 2019/0302794 | A1 | 10/2019 | Kean et al. |

FOREIGN PATENT DOCUMENTS

| JP | 2003278159 | 10/2003 |
| JP | 3809542 | 6/2006 |
| KR | 101235281 | 2/2013 |

\* cited by examiner

*Primary Examiner* — Muhammad Shafi
(74) *Attorney, Agent, or Firm* — Schwegman Lundberg & Woessner, P.A.

(57) ABSTRACT

A system for assisting remote operation of a work machine may include a work machine and remote operations equipment arranged on the work machine. The remote operations equipment may be configured to capture information about the environment of the work machine and transmit the information to a remote control station. The system may also include a remote control station configured to display images of the environment of the work machine. The system may also include an operator assist module configured for augmenting the information with a feature delineator.

16 Claims, 13 Drawing Sheets

SYSTEM AND METHOD FOR ASSISTING REMOTE OPERATION OF A WORK MACHINE

TECHNICAL FIELD

The present application relates generally to work machines such as heavy equipment for construction, farm implements, and other machines adapted for performing work. More particularly, the present application relates to remotely controlled work machines where operator awareness may be more limited. Still more particularly, the present application relates to one or more visual aids for augmenting visual sensor systems to assist the operator with the control of machine interactions.

BACKGROUND

Work machines, such as wheel loaders for example, are used for a variety of tasks requiring operator control of the work machine and one or more implements associated with the machine. This control may be performed by an operator physically on the machine, or remote from the machine using one or more remote devices. These machines can be large, complex, and powerful, increasing the desirability to know the surroundings of the machine when providing control. In particular circumstances, the work machine may be used to interact with soil, rock, the ground surface, other equipment, stationary objects, and other surrounding items. Relatively precise operation of the work machine may be performed in these circumstances to provide for efficient operation and/or to avoid damage to the work machine or the interacting equipment or surrounding items. Where vision or other senses are limited, such as when operating the work machine remotely, precise operation may be more difficult.

U.S. 2019/0302794A1 describes a targeted loading assistance system. U.S. 20190101641A1 describes a Work Tool Collision Avoidance System for Underground Objects. US 20170016211A1 describes a Display System and Construction Machine. JP2003278159 describes a Remote-Operated Construction Method and System.

SUMMARY

In one or more embodiments, a system for assisting remote operation of a work machine may include a work machine and remote operations equipment arranged on the work machine. The remote operations equipment may be configured to capture information about the environment of the work machine and transmit the information to a remote control station. The remote control station may be configured to display images of the environment of the work machine. The system may also include an operator assist module configured for augmenting the information with a feature delineator.

In one or more other embodiments, a method of assisting remote operation of a work machine may include receiving imagery and data relating to the environment of the work machine and identifying a feature in the imagery. The method may also include augmenting the imagery with a feature delineator delineating the feature.

In one or more other embodiments, a method of operating a work machine may include operating the work machine from a remote control station and relying on visual displays to understand relationships between the work machine and a surrounding environment. The method may also include manipulating controls at the remote control station based, at least in part, on the visual displays. The method may also include relying on feature delineators on the displays to control the equipment.

DETAILED DESCRIPTION

Figure 1A:
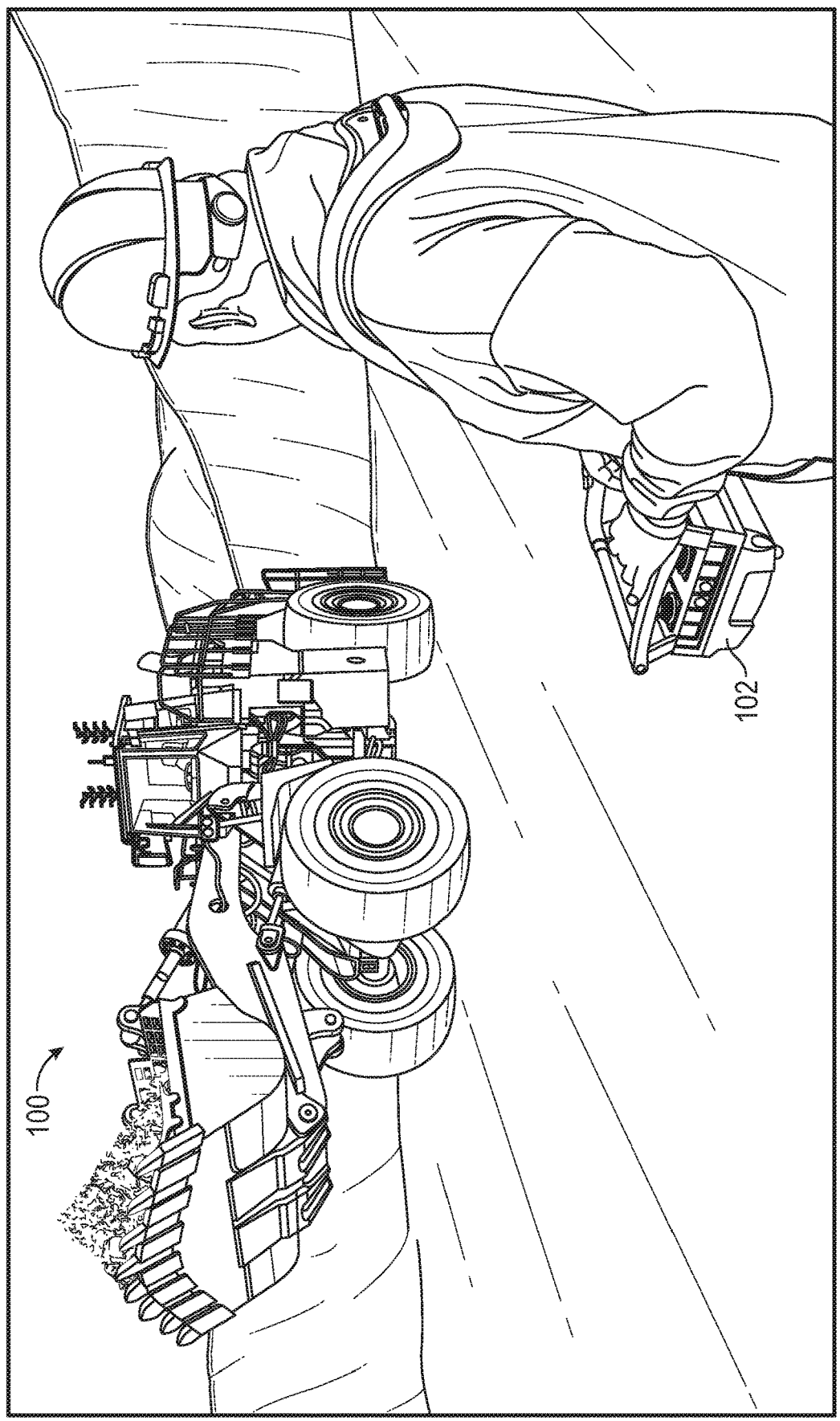
FIG. 1A is a perspective view of a work machine being operated by an operator using an onsite remote control, according to one or more embodiments.
Figure 1B:
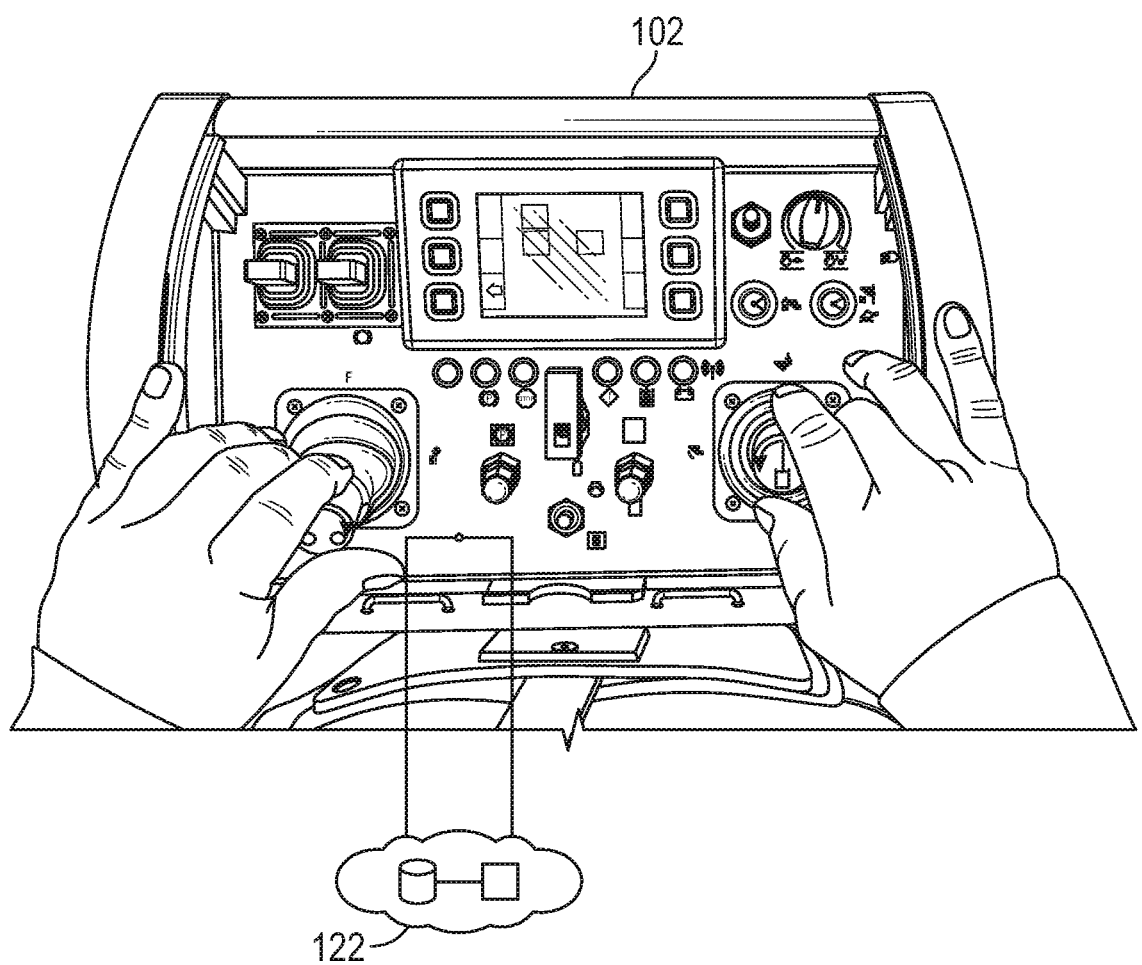
FIG. 1B is a top down view of the onsite remote control of FIG. 1A, according to one or more embodiments.

FIG. 1A is a perspective view of a work machine 100 being operated by an operator using an onsite remote control station 102, according to one or more embodiments. The work machine 100 is illustrated as a wheel loader in FIG. 1A, but can be any other work machine such as a dozer, a compactor, mixer, scraper, motor grader, excavator, material hauler, and the like. FIG. 1B is a top down view of the onsite remote control station 102 of FIG. 1A, according to one or more embodiments. As shown, the onsite remote control station 102 may have a relatively small display depicting a view out of the front of the work machine 100 providing the operator with little ability to appreciate operation of the machine 100 from the perspective of the cab. Instead, the operator may rely on direct visual feedback or other sensory feedback (sound, vibration, etc.) from the operator's position on the site.

Figure 2:
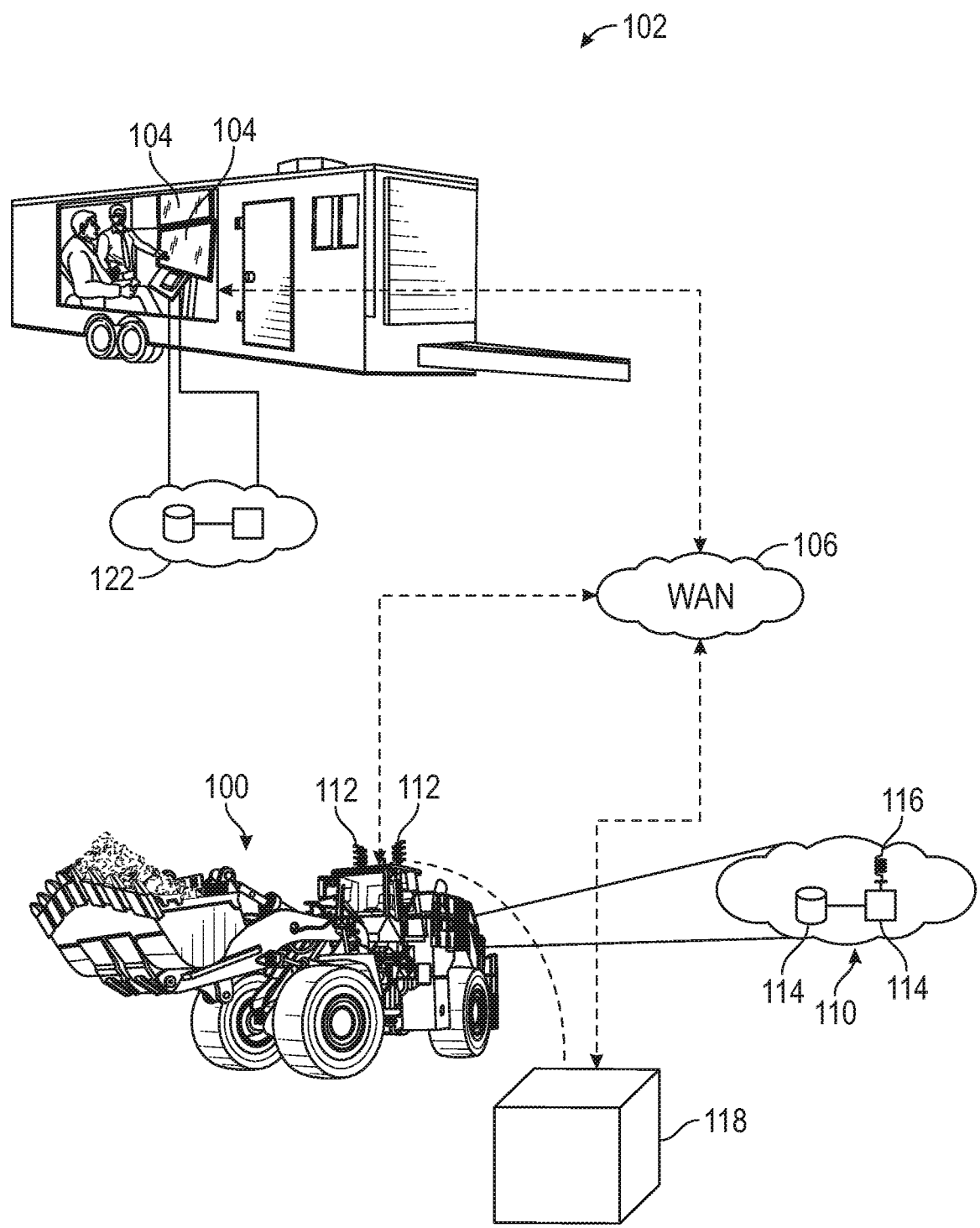
FIG. 2 is a schematic diagram of a work machine being operated by an operator located at a remote site via a wide area network, according to one or more embodiments.

FIG. 2 is a schematic diagram of a work machine 100 being operated by an operator using a remote control station 102 located at a remote site via a wide area network 106, according to one or more embodiments. In this embodiment, direct visual feedback and other sensory feedback is unavailable and the operator may rely on one or more relatively large displays 104 providing visual and potentially sound feedback from the site and based on one or more sensors positioned on the work machine 100. In this embodiment, a user's awareness of the machine activity, the machine operation, and the surroundings may be provided solely by the display, which may be a two-dimensional display 104.

Figure 3:
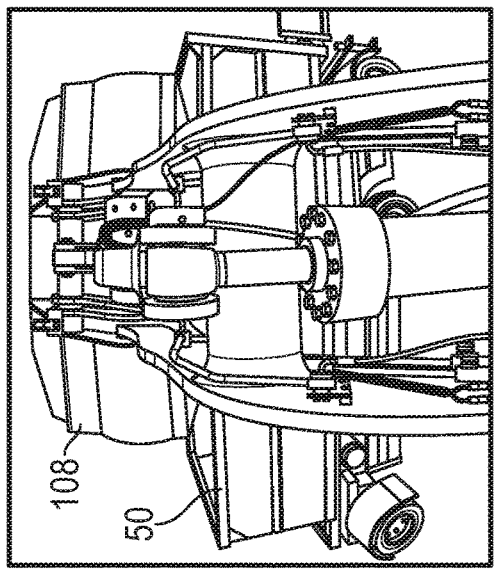
FIG. 3 is a remote operator image of bucket of a wheel loader approaching a truck rail, according to one or more embodiments.
Figure 4:
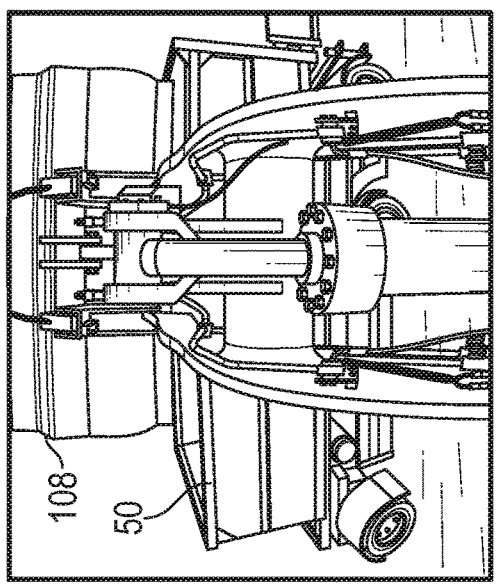
FIG. 4 is a remote operator image of a bucket of a wheel loader positioned over a truck rail, according to one or more embodiments.
Figure 5:
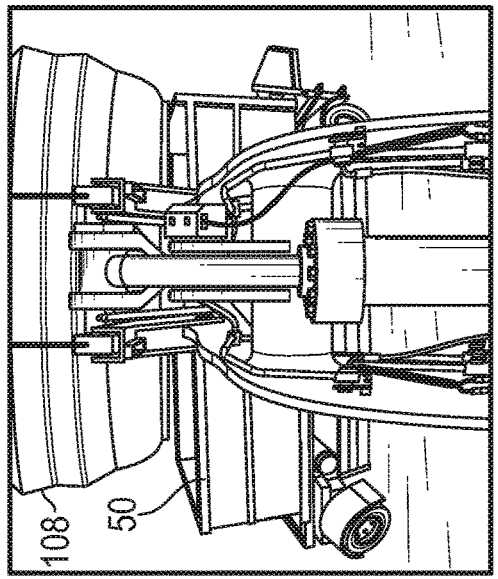
FIG. 5 is a remote operator image of a bucket of a wheel loader passed a truck rail and over a bed of the truck, according to one or more embodiments.

An example of such an experience is shown in FIGS. 3-5. As shown, FIG. 3 is a remote operator image of bucket 108 of a wheel loader 100 approaching a truck rail 50. As shown, the operator's view may be somewhat obstructed by the lift arms of the bucket 108, the associated hydraulics, and the bucket 108 itself. Moreover, given the two-dimensional nature of the display, the distance between the bucket/arms and the truck may not be as easily perceivable. This may be more apparent from a comparison of FIG. 3 with FIG. 4, which is a remote operator image of a bucket 108 of a wheel loader positioned over a truck rail 50. That is, where the bucket 108 was approaching the rail 50 in FIG. 3, the bucket 108 is above the rail 50 in FIG. 4 and the images are quite similar. FIG. 5 is a remote operator image of a bucket 108 of a wheel loader passed a truck rail 50 and over a bed of the truck, according to one or more embodiments. When compared to FIGS. 3 and 4, while differences exist and while perception is not overly limited, features of the present application may assist with more quickly and confidently perceiving the relationship between the equipment.

Figure 6:
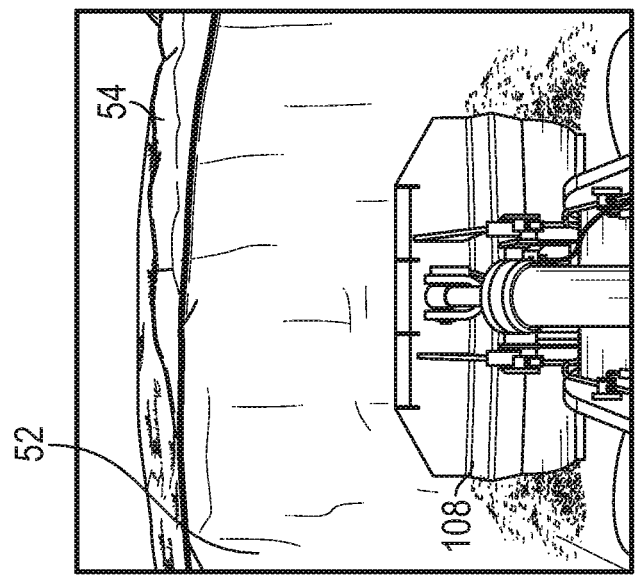
FIG. 6 is a remote operator image of a bucket of a wheel loader approaching a toe of a dirt pile, according to one or more embodiments.
Figure 7:
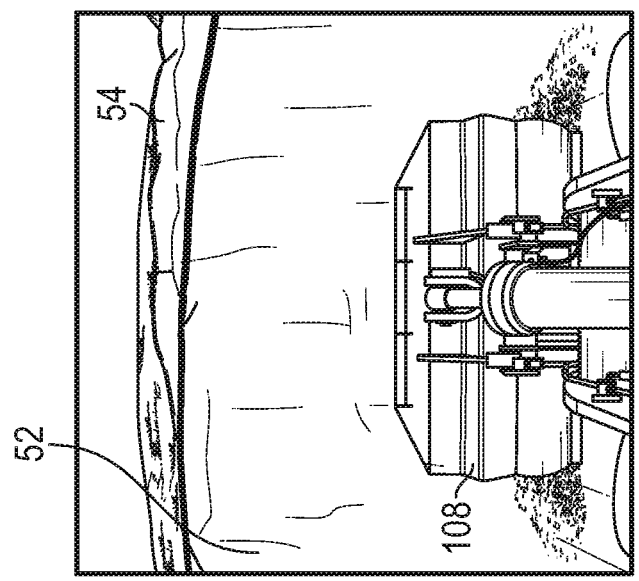
FIG. 7 is a remote operator image of a bucket of a wheel loader closing in on a toe of a dirt pile, according to one or more embodiments.
Figure 8:
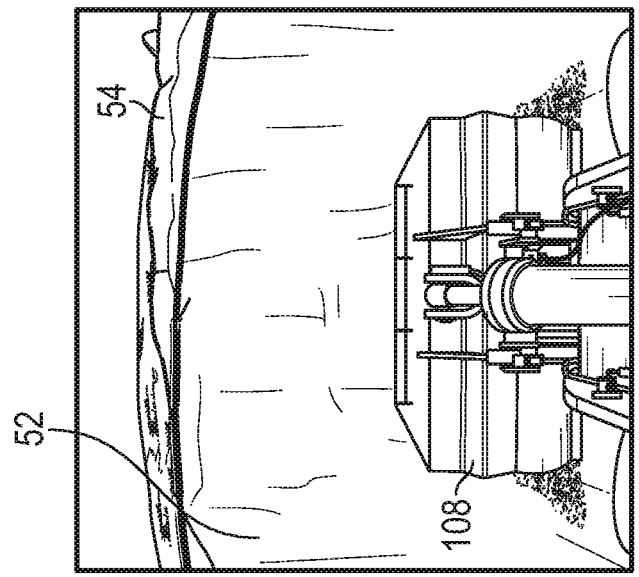
FIG. 8 is a remote operator image of a bucket of a wheel loader engaged with a dirt pile, according to one or more embodiments.

Similarly, relationships between the equipment and the ground may be difficult to perceive using remote imagery. For example, FIG. 6 is a remote operator image of a bucket 108 of a wheel loader 100 approaching a toe 52 of a dirt pile 54, according to one or more embodiments. As shown, the toe 52 of the dirt pile 54 (e.g., where the slope of the pile meets the relatively flat ground) may be difficult to perceive. FIG. 7 is a remote operator image of a bucket 108 of a wheel loader 100 closing in on a toe 52 of a dirt pile 54, according to one or more embodiments and without a clear idea of where the toe 52 of the dirt pile 54 is, an operator may have difficulty properly operating the bucket 108. That is, for example, an operator may keep the bucket 108 above the ground unless/until the bucket is close to entering the dirt pile 54. The operator may, thus, lower the bucket 108 at just the right moment when engaging the dirt pile 54 or to clean up the area in front of the dirt pile, the operator may lower the bucket ahead of engaging the dirt pile. FIG. 8 is a remote operator image of a bucket 108 of a wheel loader engaged with a dirt pile 54, according to one or more embodiments. As shown, and again, the toe 52 of the dirt pile 54 may not be very apparent from the two-dimensional imagery and an operator may have difficulty suitably engaging the dirt pile 54. Moreover, where the operator chooses to engage the ground ahead of engaging the dirt pile, the force being applied to the ground by the bucket can be helpful to make sure the ground is not torn up or overly damaged. As an additional note, an operator may engage the dirt pile until the machine slows or seems to have engaged the dirt pile as far as it can. For an in-cab operator in these situations, sensations of stopping or slowing of the machine, sounds of hydraulic and/or motor exertion, vibrations, and other sensory feedback can allow an in-cab operator to recognize that the bucket is engaging the ground sufficiently, but not too much or that the wheel loader has engaged the dirt pile as much as it can and forward motion may be stopped to allow the machine to lift the bucket and reverse from the pile to remove a load of dirt.

Figure 9:
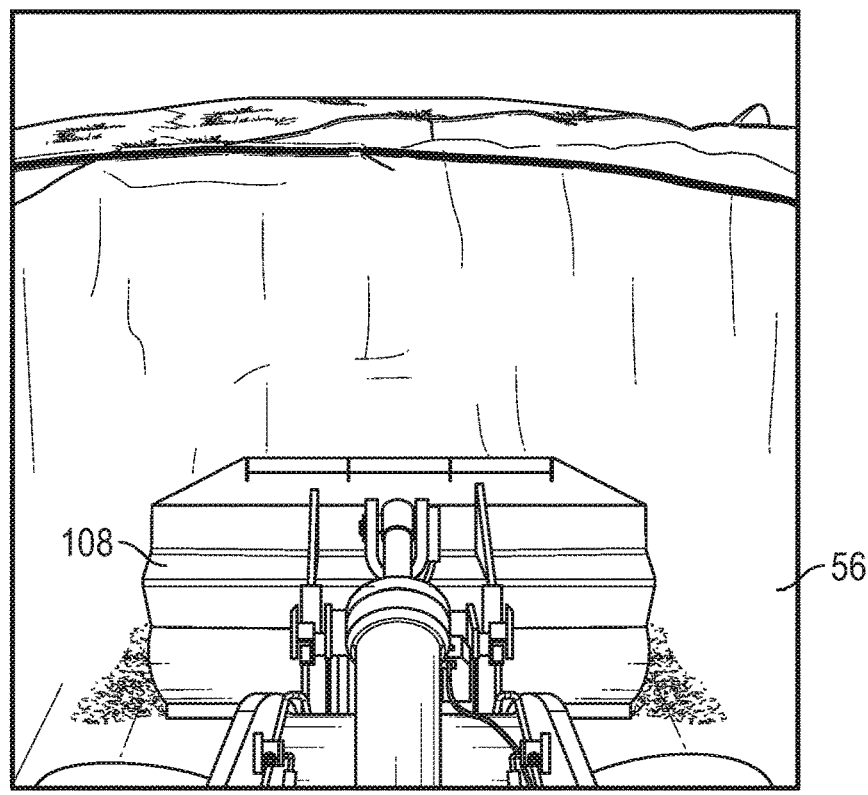
FIG. 9 is a remote operator image of a bucket of a wheel loader held above the ground, according to one or more embodiments.

FIG. 9 is a remote operator image of a bucket 108 of a wheel loader 100 held above the ground 56, according to one or more embodiments. That is, when travelling across ground, an operator may hold the bucket 108 above the ground to avoid scuffing the ground 56 and the operator may desire that the bucket 108 be relatively low to provide for clear vision across the top of the bucket 108. As shown in FIG. 9, however, the ability to perceive the height of the bucket 108 above the ground 54 may be relatively difficult to perceive on a two-dimensional display.

In a similar situation, an operator may commonly place the bucket against the ground and reverse the machine to "back drag" the ground and flatten or smooth the ground. Like the situation of engaging the dirt pile, an in-cab operator may listen to the equipment and rely on sound, hydraulic whining, motor exertion, vibration, or other sensory feedback to get a feel for how much pressure the bucket is applying to the ground such that smoothing of the ground may occur without damaging the ground, spinning the wheels, and/or otherwise defeating the purpose of back dragging.

The present application may include features particularly adapted for assisting a work machine operator with perception of surrounding equipment and objects and machine interaction with equipment and objects, particularly when operating the work machine remotely and even more particularly when operating a machine remotely and from offsite where direct visual or sensory feedback is not available.

With reference again to FIG. 2, a remote operable work machine 100 may be equipped with remote operations equipment 110 allowing for communications to and from the work machine. For example, communications leaving the machine may include machine operation and diagnostic information such as those that may otherwise or more commonly be shown on a dashboard or in-cab display, for example. In addition, for purposes of remote operation, communications leaving the machine may include sensory data including imagery, sound, spacial data, hydraulic force and/or pressure data and the like. Incoming communications may include operational commands that may otherwise or more commonly come from the in-cab controls such as directional controls, throttle controls, braking controls, and implement controls. The remote operations equipment may include sensors 112, a remote operations computing system 114, and a remote operations transceiver 116.

The remote operations transceiver 116 may be configured for receiving information from the remote operations processor and transmitting the information to the remote control station. The remote operations transceiver may also be configured for receiving information transmissions from the remote control station and providing that information to the remote operations processor. As shown in FIG. 1, the remote operations transceiver may include a local area communication system such as a radio frequency transceiver, a Bluetooth transceiver, WiFi, or another transceiver adapted for communications over relatively short distances. As shown in FIG. 2, the remote operations transceiver may include a wide area network transceiver, which may provide for direct communications to the wide area network such as through a cellular network connection. Alternatively or additionally, the remote operations transceiver may be configured to communicate with a close-by relay 118, for example, where the radio frequency, Bluetooth, WiFi, or other local communication system may be used to communicate to the relay, which may communicate the signals to and from a wider area network, such as over a cellular network, for example. While wireless communications have been described, the hardwired communication systems between the relay and the network and/or between the remote control station and the network may also be provided.

The remote operations computing system 114 may be configured for facilitating remote operations by processing sensory information and by processing control information. In one or more embodiments, the remote operations computing system 114 may be a module built into the computing system of the work machine equipment. In other embodiments, a separate computing system may be provided, for example, when a work machine is retrofitted with remote operations equipment. In either case, the remote operations computing system 114 may include computer readable storage medium encoded with machine readable instructions for receiving and transmitting machine information and for receiving and implementing machine controls. The storage medium can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art. The remote operations computing system 114 may also include a processor such as a computer processor adapted for executing the machine readable instructions to transmit information and control the operations of the machine 100. In one or more embodiments, the remote operations computing system may include the machine controller and/or be in communication with the machine controller to operate the machine 100.

The sensors 112 of the present work machine may include one or more sensors 112 adapted to provide sensory feedback to the operator. In one or more embodiments, the sensors 112 may include spatial sensors, auditory sensors, tactile sensors, pressure sensors, force sensors and the like.

For example, spatial sensors may be configured for providing visual imagery of the work machine operation such that the user may have a visual perception of the machine operation and its relationships to the surrounding environment and equipment. In one or more embodiments, the spatial sensors may include one or more image capture devices, such as cameras, arranged on the work machine and adapted to provide video imagery of the environment at or near the front of the machine. The image capture devices may be optical image sensors or devices that include optical image sensors, for example. The image sensors may be digital imagers, or other analog or digital devices configured to convert received light into electronic signals, and may be incorporated into one or more image capture devices, such as cameras, for example. The image capture devices may be configured to provide still images, video feeds, or the like, for one or more areas surrounding or adjacent the work machine. For example, the image capture device may be incorporated in a camera and may be image sensors for capturing video including, but not limited to, a semiconductor charge-coupled devices (CCD) type sensor, a complementary metal-oxide-semiconductor (CMOS) type sensor, an N-type metal-oxide-semiconductor (NMOS) type sensor, or other any type of image sensor or combinations thereof. In one or more embodiments, two cameras may be provided to allow for stereoscopic vision of the front area of the work machine. Alternatively or additionally, spatial sensors may include radar systems or lidar systems such as 1 dimensional lidar or three dimensional lidar systems (e.g., three dimensional scanners), for example. The radar or lidar systems may provide for identifying equipment or other obstructions in the environment surrounding the work machine and may be used separately or in conjunction with the image capture devices to provide spatial information to the operator. Still other spatial sensors may include a thermal imager, a load sensor, an ultrasonic sensor, or the like, configured to collect data regarding physical properties of the area surrounding or adjacent the work machine.

As another example, auditory sensors may include microphones or other auditory features allowing the operator to hear the machine. Tactile sensors may be sensors adapted to sense the vibrations of the machine and transmit signals allowing for replication or mimicking of the vibrations or movement. Still further, hydraulic pressure sensors, other pressure sensors, or force sensors may be provided, which may sense particular aspects of machine exertion and/or machine interaction with other equipment or an object. For example, hydraulic sensors may be present on the bucket control arm that sense the amount of down pressure a bucket is exerting on the ground. Still other pressure or force sensors for sensing other pressures and for other purposes may be provided.

Figure 10:
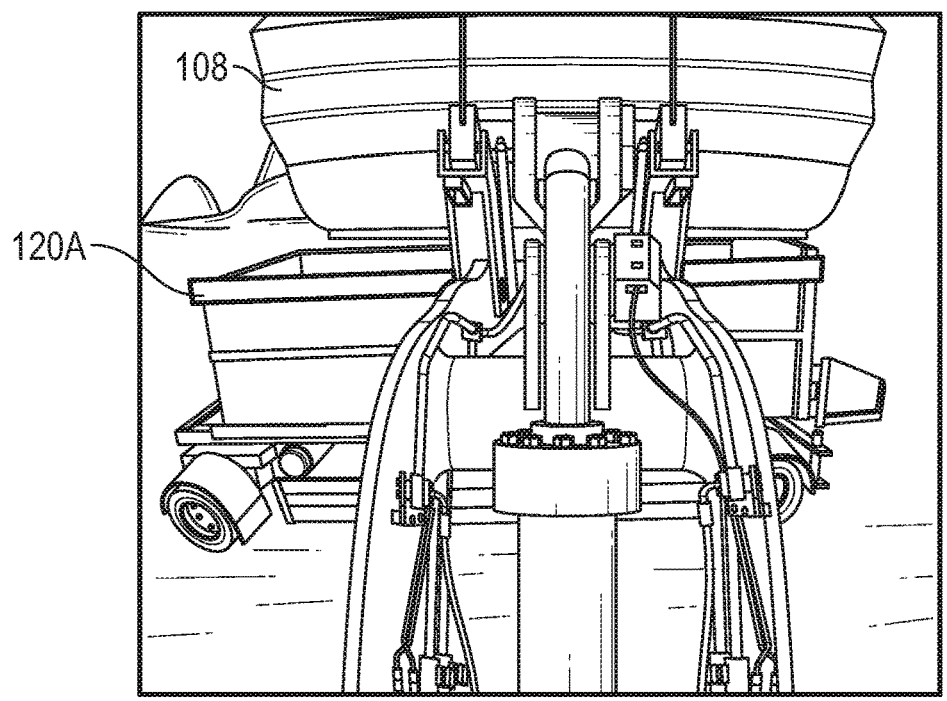
FIG. 10 is a remote operator image of a bucket of a wheel loader approaching a truck rail and having a feature delineator delineating the truck rail, according to one or more embodiments.
Figure 11:
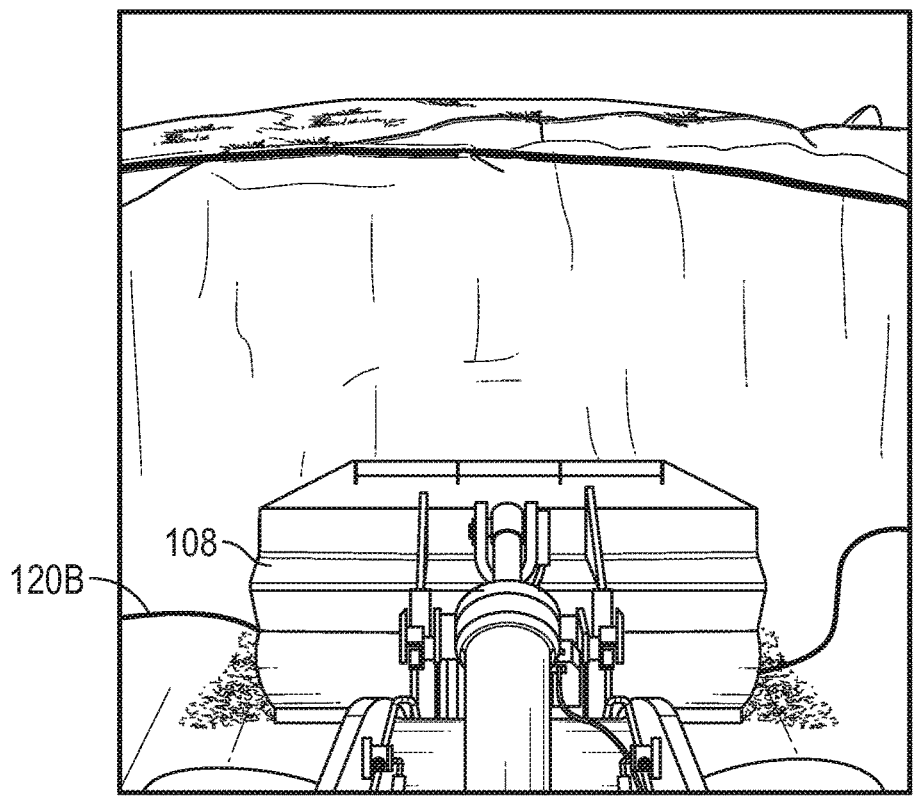
FIG. 11 is a remote operator image of a bucket of a wheel loader approaching a dirt pile and having a feature delineator delineating the toe of the dirt pile, according to one or more embodiments.
Figure 12:
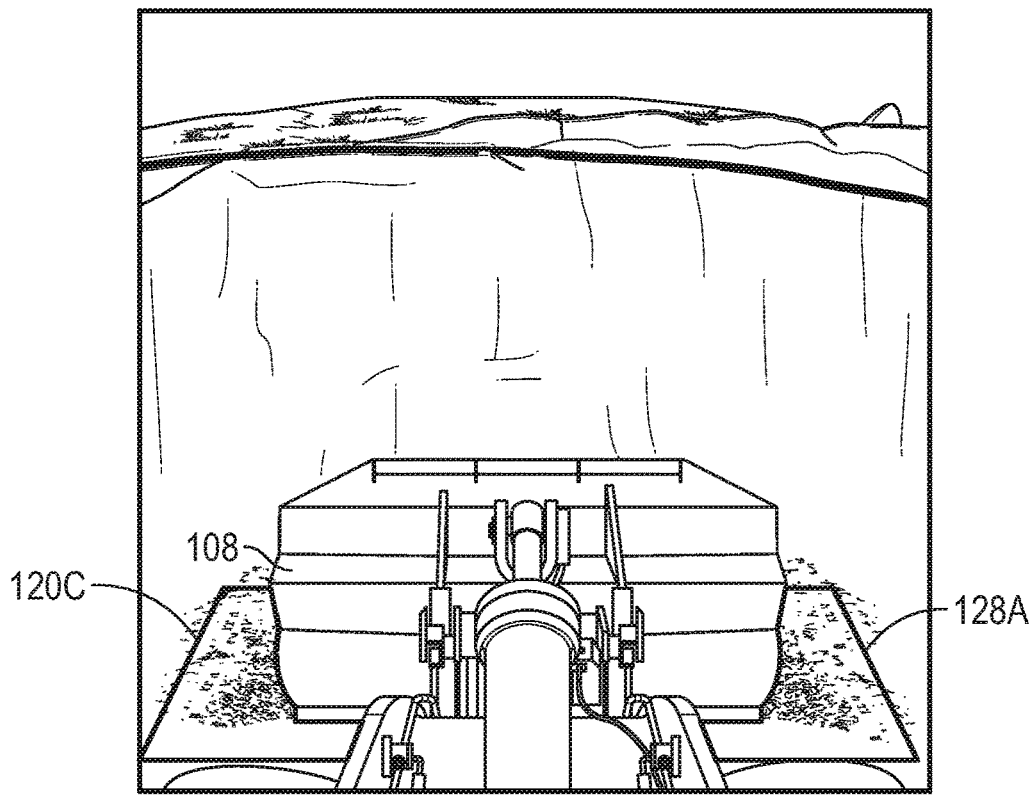
FIG. 12 is a remote operator image of a bucket of a wheel loader held above the ground and having a feature delineator delineating the surface of the ground below the wheel loader, according to one or more embodiments.

As mentioned, the remote operations computing system 114 may receive, among other things, spatial, pressure, or force information from the sensors and transmit the information to a remote control station 102 via, the communication transceiver 116. The remote control station 102 may be adapted to receive the information and display the information for the operator. In one or more embodiments, for example, the remote control station 102 may be adapted to analyze and/or augment the spatial data displayed for the user. In particular, as shown in FIG. 10, the remote control station 102 may be adapted to provide a feature delineator to assist the operator in understanding where particular features of the environment around the work machine are located. As shown in FIG. 10, a feature delineator 120A may include an augmentation line extending across the top edge of a nearby dump truck where the augmentation line delineates the top rail of the truck and assists the operator in understanding the location of the top rail. As shown in FIG. 11, a feature delineator 120B may include a curvilinear augmentation line extending along the seam between the toe of a dirt pile and the otherwise substantially flat ground. In still another example as shown in FIG. 12, a feature delineator 120C may include a shadow or other indication of the ground surface to assist the operator in understanding the position of the bucket relative to the ground.

With reference back to FIGS. 1B and 2, the feature delineations may be provided by an operator assist module 122. As mentioned above, the remote control station may be adapted to analyze and/or augment the spatial data displayed for the operator and, as such, the operator assist module may be incorporated into the remote control station 102. However, as may be appreciated, the operator assist module 122 may alternatively or additionally be incorporated into the computer systems of the work machine 100. In either case, the operator assist module 122 may include a computing device configured for analyzing the spatial data generated by the spatial sensors and augmenting the resulting imagery to assist with operator perception.

In one or more embodiments, the operator assist module 122 may analyze the spatial data to identify particular features of the surrounding environment. For example, and as noted above with respect to FIGS. 10, 11, and 12, the operator assist module 122 may be adapted to identify and delineate with a feature delineator the location of a rail 50 of a truck, a seam between a dirt pile and the ground (e.g., the toe 52 of the dirt pile), and/or the surface of the ground 54. Still other features of the surrounding environment may be identified and delineated with feature delineators.

As with the remote operations equipment 110, in one or more embodiments, the operator assist module 122 may include a non-transitory computer readable storage medium and a processor. The storage medium can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EE-PROM) memories. Examples of volatile memories include random access memories (RAM), dynamic random-access memories (DRAM), static random-access memories (SRAM), and other forms of volatile memories known in the art. The medium may include data and computer readable instructions stored thereon allowing for the identification of features of the surrounding environment. For example, the data may include information about a range of heights of truck rails or other details about equipment the work machine may have the potential to interact with. In one or more embodiments, the data may include sizes, shapes, and orientations of features of potential surrounding equipment. The instructions on the medium may include instructions for identifying features of surrounding equipment or environment based on the data and/or based on the image data. That is, for example, and in the case of a truck rail, the instructions may include methods for analyzing contrasts in an area (e.g., a height) where a truck rail is anticipated to be. Still further, the instructions may include methods for analyzing the image data using multiple cameras and relying on the relative angles provided by the stereoscopic image data to identify the location of particular surrounding elements. By relying on the color contrasts in the imagery, the spatial relationships between multiple sets of image data, and/or the anticipated height, size, and orientation of the truck rail, the processor of the operator assist module may be able to identify the truck rail in the images. Having identified the truck rail, the processor of the operator assist module may augment the image by delineating the truck rail with a feature delineator 120A. For example, the operator assist module may overlay the image with a bright line, for example as shown in FIG. 10.

It is to be appreciated that while the above analysis has been described as being based on image data, other spatial data may be used to assist as well. For example, where additional sensors such as lidar, radar, or other spatial sensors are used, the operator assist module 122 may incorporate that information into the analysis as well. For example, a one-dimensional lidar may be able to provide distance information and, as such, may be able to identify the distance from a work machine 100 to the side of a truck. This may allow the operator assist module 122 to understand how far in front of the work machine 100 a truck rail 50 is, for example, and may assist with identifying the location of a top rail 50 in an image. Where three-dimensional scanning is available, a model of the surrounding environment may be generated and the rail 50 may be identified by analyzing the model. Still other technologies may be incorporated into the system to identify features of the surrounding environment. In one or more embodiments, fiducial information may be stored in the computer readable storage medium and/or instructions on reading fiducials may be stored. That is, for example, where fiducials may be present on surrounding equipment, the storage medium may include instructions for a processor to analyze image data and generate information from fiducials present in the image data. In one or more embodiments, the system may rely on the fiducial simply spatially where positioning of the fiducial relative to a top rail of a dump truck is known, for example, and when the fiducial is recognized, the top rail location and orientation relative to the fiducial is automatically known. In short, due to the patterns present in fiducial, a fiducial may be more easily recognized amidst the surrounding environment. Additionally or alternatively, the fiducial and the reading of the fiducial may be more sophisticated similar to a QR code and the system may scan the fiducial to obtain information about the equipment the fiducial is on. The information gleaned from the fiducial may be used to assist with identifying the location of features of the equipment.

While the above system has been described in the context of identifying a truck rail 50, other features of the surrounding environment may be identified as well. For example, as shown in FIG. 11, a seam between a dirt pile and the ground surface or toe 52 may be identified. In this case, the storage medium may include data about features of a dirt pile and, in particular, may include data indicating that particular ranges of a change in slope may be indicators of a location of a toe 52 of a dirt pile. The computer readable instructions may include a method of reviewing the spatial data (e.g., image-based or otherwise) and identifying a curvilinear line defining a change in slope from generally horizontal to slanted. The identification may be based on changes in color contrast, spatial information identifying a change in slope and other techniques. Using these features, the processor of the operator assist module may be able to identify the toe 52 of a dirt pile. Having identified the toe, the processor of the operator assist module 122 may augment the image with a feature delineator 120B. For example, the operator assist module 122 may overlay the image with a curvilinear bright line, for example as shown in FIG. 11.

A similar approach may be used to identify the surface of the ground 54. For example, the storage medium may include information identifying the ground as generally level and/or generally parallel to the angle of the work machine 100, which is supported by the ground 54. Using image data and/or other spatial data together with the data stored on the medium, the processor may identify the plane of the ground and may augment the image data by identifying the plane of the ground in the images. In one or more embodiments, the augmented image may include feature delineator 120C such as a parallelogram-like outline below the bucket 108 identifying the plane of the ground 54 relative to the bucket 108 as shown in FIG. 12.

In the above conditions, the augmentation of the image data may provide for an augmented image and the operator assist module 122 may continually augment the image data. The image data may be displayed at the remote control station 102 (e.g., on one or more screens or on the remote control itself). With the augmented images, the operator may more suitably control the work machine 100.

Figure 15:
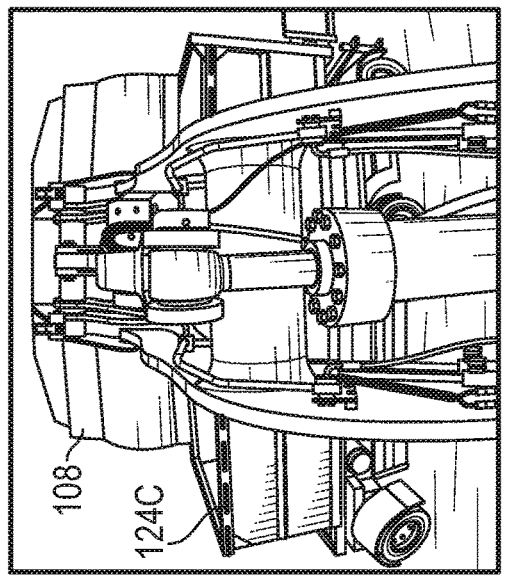
FIG. 15 is a remote operator image of a bucket of a wheel loader passed a truck rail and over a bed of the truck and having a smart feature delineator delineating the truck rail and providing an indication of proximity to the truck rail, according to one or more embodiments.
Figure 14:
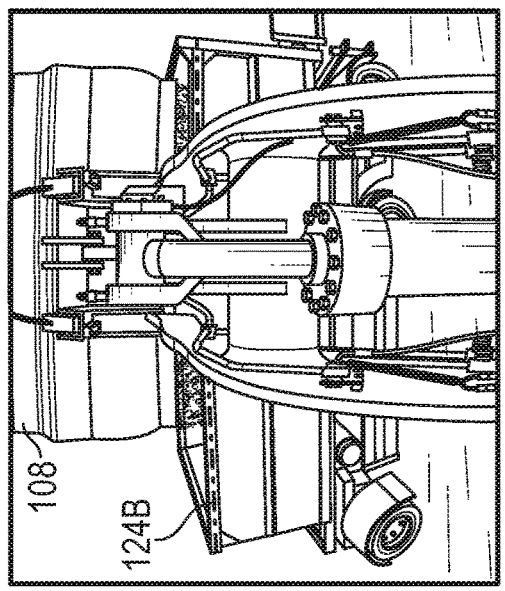
FIG. 14 is a remote operator image of a bucket of a wheel loader positioned over a truck rail and having a smart feature delineator delineating the truck rail and providing an indication of proximity to the truck rail, according to one or more embodiments.
Figure 13:
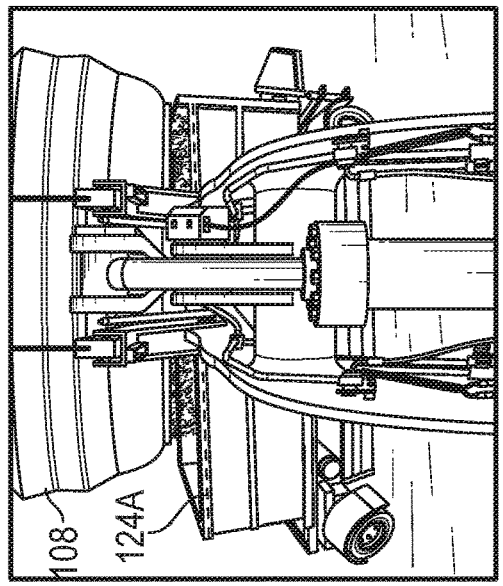
FIG. 13 is a remote operator image of bucket of a wheel loader approaching a truck rail and having a smart feature delineator delineating the truck rail and providing an indication of proximity to the truck rail, according to one or more embodiments.
Figure 16:
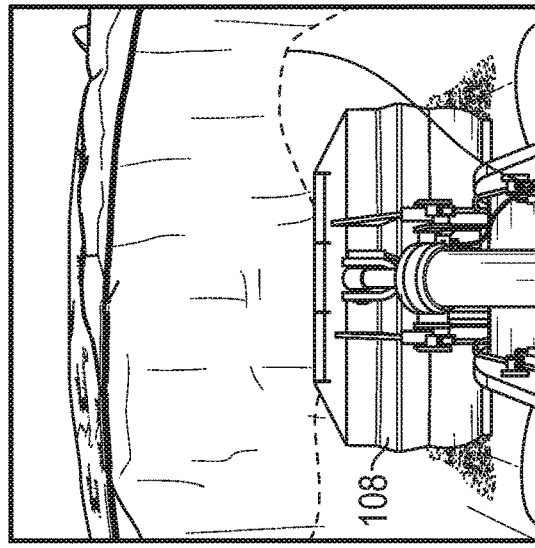
FIG. 16 is a remote operator image of a bucket of a wheel loader approaching a toe of a dirt pile and having a smart feature delineator delineating the toe and providing an indication of proximity to the toe, according to one or more embodiments.
Figure 17:
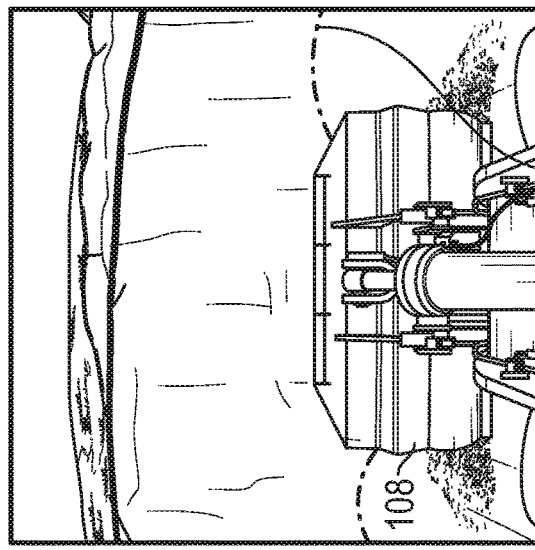
FIG. 17 is a remote operator image of a bucket of a wheel loader closing in on a toe of a dirt pile and having a smart feature delineator delineating the toe and providing an indication of proximity to the toe, according to one or more embodiments.
Figure 18:
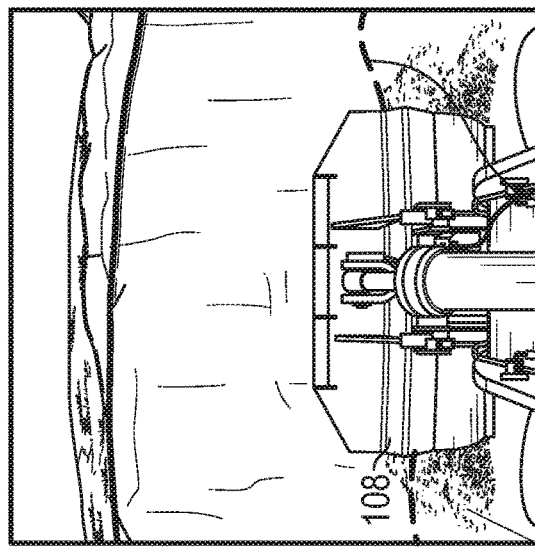
FIG. 18 is a remote operator image of a bucket of a wheel loader engaged with a dirt pile and having a smart feature delineator delineating the toe of the dirt pile and providing an indication of proximity to the toe, according to one or more embodiments.

Turning now to FIGS. 13-15, the operator assist module 122 may also augment the images with one or more smart feature delineators. That is, while object delineation may be helpful, object delineation that changes as the work machine moves or engages surrounding objects may be even more helpful. In particular, for example, and as mentioned with respect to FIGS. 3-5, the relative distance between a work machine and a dump truck may be difficult to perceived when operating via a remote control station 102. In one or more embodiments, the operator assist module 122 may rely on the spatial data captured by the spatial sensors to provide varying degrees of delineation as shown in FIG. 13-15. That is, as shown in FIG. 13, a smart feature delineator 124A in the form of a relatively thin delineation line may be provided as the work machine 100 approaches the dump truck. Where the work machine 100 gets closer to the dump truck as shown in FIG. 14 and the bucket 108 is above the rail 50 of the dump truck, a smart feature delineator 124B in the form of a more pronounced (e.g., thicker) delineation line may be provided. Still further, as shown in FIG. 15, where the bucket is passed the rail 50 and above the bed of the dump truck, a smart feature delineator 124C in the form of a still more pronounced (e.g., thicker) delineation line may be provided. In one or more embodiments, the smart delineator may include a line that may flash slowly when the work machine is far away, more quickly when the work machine is close, and fervently when the work machine very close to the dump truck. In one or more embodiments, the smart delineator may include a color and the color may change from green, to yellow, to red, as the work machine progresses through the stages shown in FIGS. 13-15. Still other color profiles may be used.

The operator assist module 122 may provide a similar smart feature delineator for purposes of assisting the operator as the work machine approaches a dirt pile. That is, for example an operator may prefer to keep the bucket of the work machine above the ground unless until the work machine is about to encounter the dirt pile. Here, the operator assist module 122 may rely on the spatial data to delineate the toe of the dirt pile as described above with respect to FIG. 11, but a smart delineator 126A, 126B, and 126C may be provided in the form of a thin line, a more pronounced line, and a very pronounced line, respectively, as the work machine approaches the dirt pile. As such, the operator may not only be able to perceive where the toe is, but also how close to the toe the work machine 100 is getting. As with the truck rail, the smart delineator 126A, 126B, 126C may flash slowly, faster, and fervently, as the work machine approaches and/or the line may change colors from green, to yellow, to red, for example. Still other visual effects may be used to reflect a changing spatial relationship in addition to the location of a feature.

Figure 19:
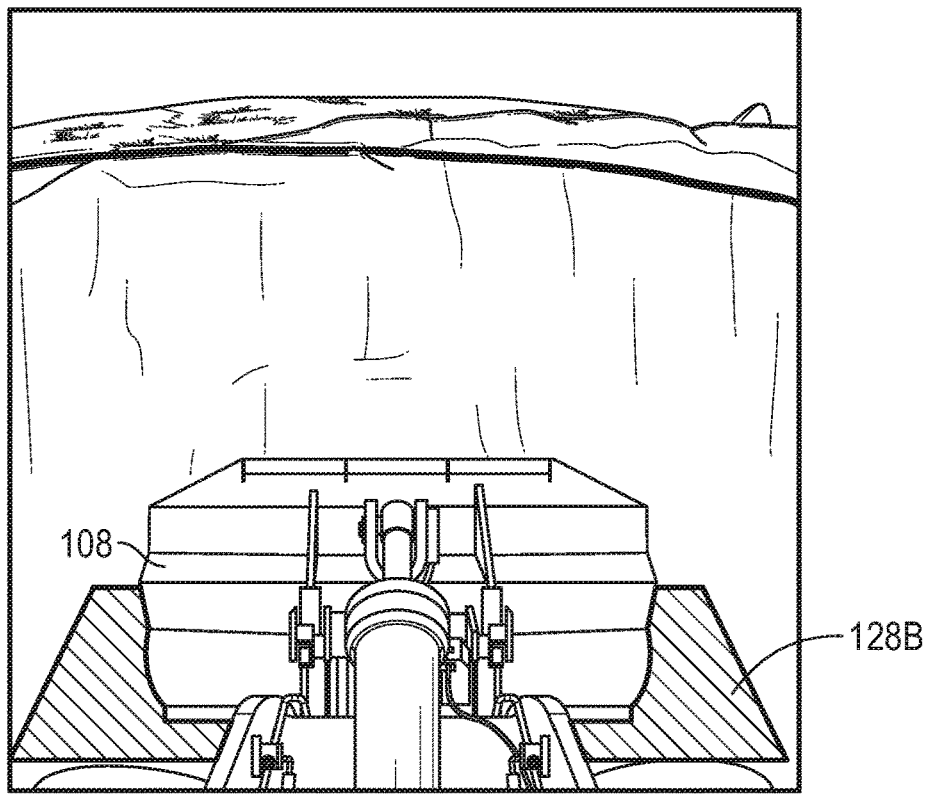
FIG. 19 is a remote operator image of a bucket of a wheel loader held above the ground and having a smart feature delineator delineating the surface of the ground and providing an indication of the bucket height above the ground, according to one or more embodiments.
Figure 20:
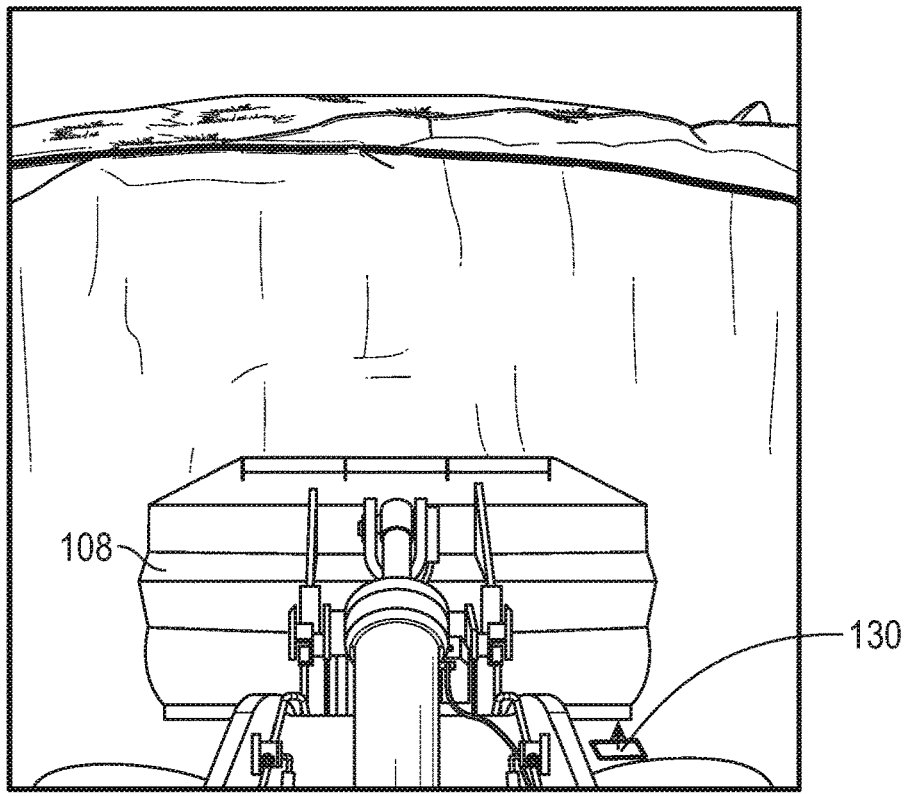
FIG. 20 is a remote operator image of a bucket of a wheel loader held above the ground and having a smart feature delineator delineating the surface of the ground and providing an indication of the bucket height above the ground, according to one or more embodiments.
Figure 21:
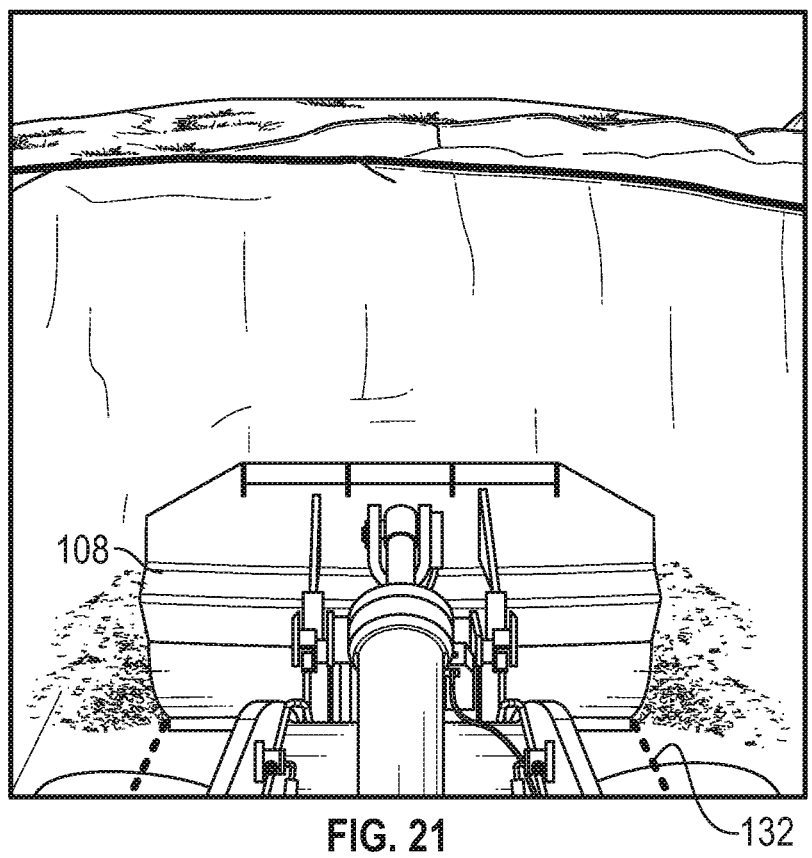
FIG. 21 is a remote operator image of a bucket of a wheel loader held above the ground and having a smart feature delineator delineating the surface of the ground and providing an indication of the bucket height above the ground, according to one or more embodiments.
Figure 22:
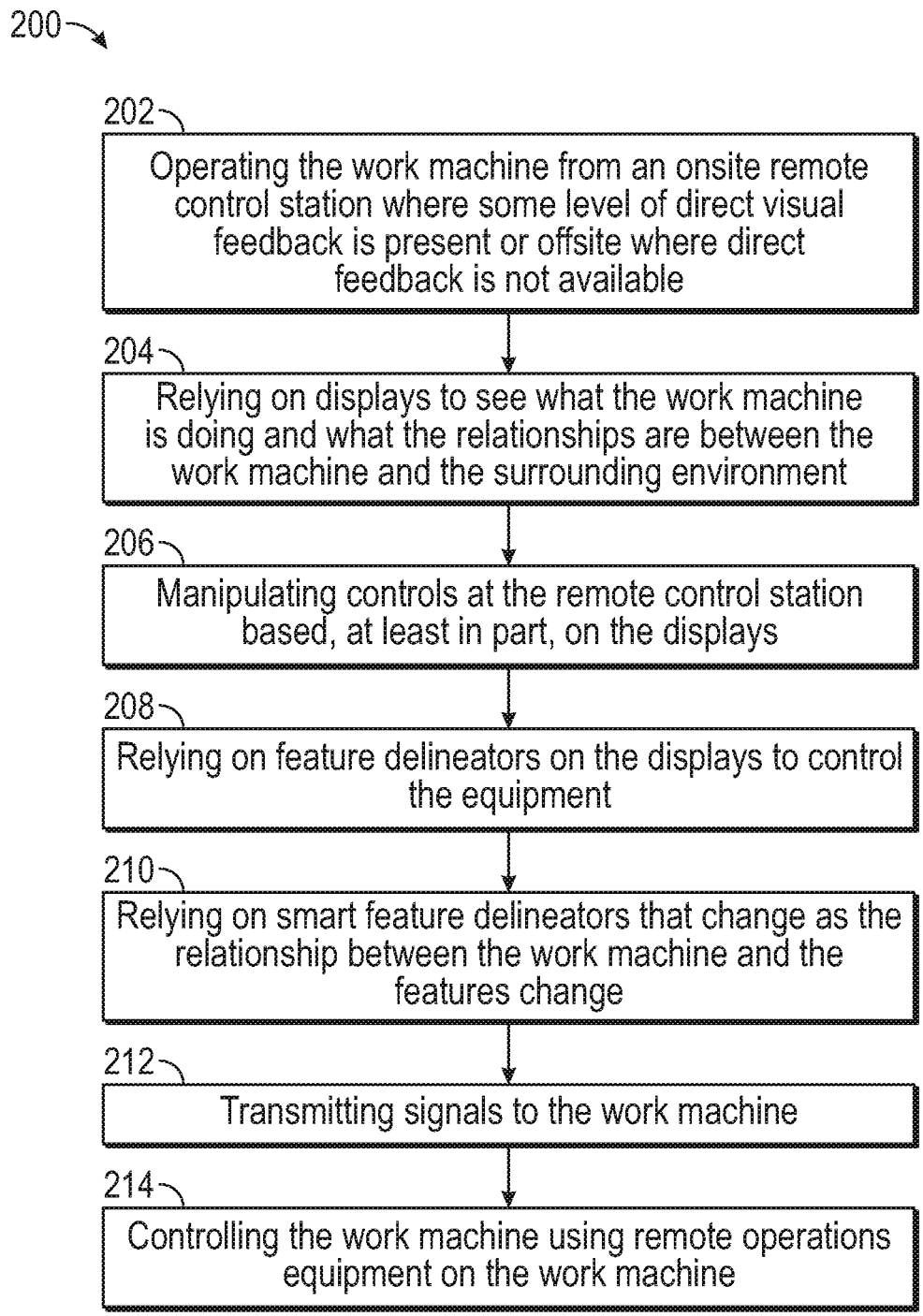
FIG. 22 is a diagram of a method of operating a work machine.
Figure 23:
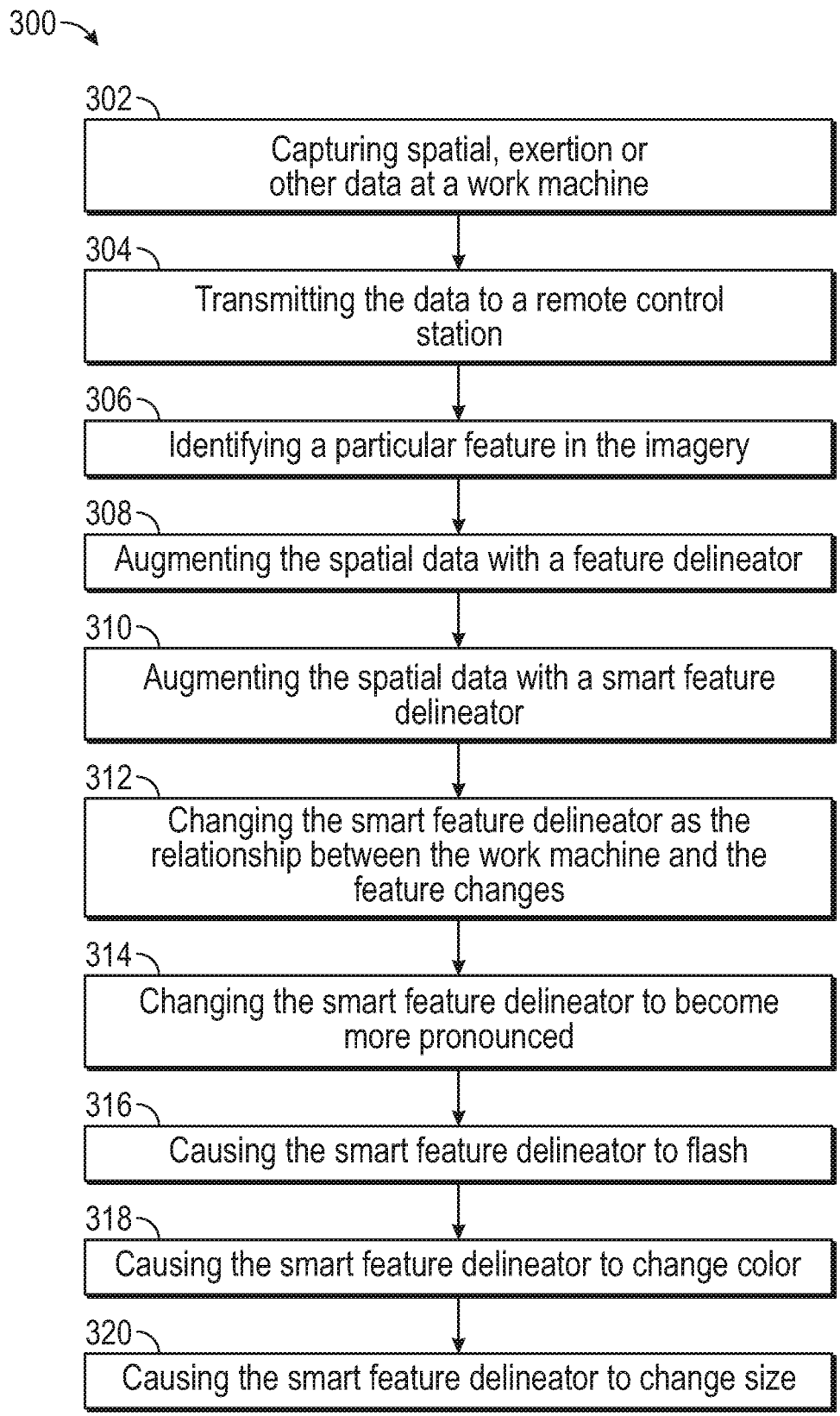
FIG. 23 is a diagram of a method of assisting remote operation of a work machine.

The operator assist module 122 may provide a similar smart feature delineator for purposes of assisting the operator with knowing the relationship between the bucket 108 and the ground surface 54. For example, a smart feature delineator may be provided that changes as the bucket nears the ground. For example, a smart feature delineator 128A in the form of an outline like FIG. 12 may be provided when the bucket is far from the ground, a smart feature delineator 128B in the form of a semi-shaded or filled in outline as shown in FIG. 19, or a smart feature delineator in the form of a fully filled opaquely filled outline when the bucket is in contact with the ground. In one or more other embodiments, the smart feature delineator may include an outline that is filled in for all heights above the ground but it may change color from green, to yellow, to red, and/or the outline or filled outline may flash slowly, more quickly, and fervently as the bucket touches the ground. In one or more embodiments, the smart feature delineator may be in the form of a shadow and may be much broader than the bucket when the bucket is high above the ground, smaller as the bucket approaches the ground, and coterminous with the outside perimeter of the bucket when the bucket reaches the ground. Still other smart feature delineators for the bucket relative to the ground are shown in FIGS. 20 and 21. In FIG. 20, for example, a smart feature delineator 130 is provided in the form of a ground indication that identifies the plane of the ground and an extension line extends up from the ground to identify the distance between the ground and the bucket. The extension line may adjust in length as the bucket is raised and lowered relative to the ground. The smart feature delineator 132 of the ground may also take the form of runway lines as shown in FIG. 21. For example, the runway lines may align with the plane of the ground and the sides of the bucket and may be light when the bucket is high, more pronounced when the bucket is approaching the ground and bold when the bucket is near the ground. The runway lines may also flash and/or change color as described above. While several types of smart delineators have been described separately, one or more of the smart delineation techniques may be used in conjunction with one another as appropriate. For example, the size, flashing, and color effects may be used together. Still other combinations may be used.

The operator assist module 122 may provide further information based on pressure and/or force sensors on the machine. For example, while the position relative the ground may be helpful, the amount of force a bucket is applying to the ground may be helpful in particular situations as well. That is, as described above with respect to smoothing the ground prior to engaging the dirt pile, engaging the dirt pile, and/or back dragging, the amount of exertion of the machine may be helpful for purposes of knowing how hard the bucket is engaging the ground or how much work the machine is using to engage a dirt pile. In the case of bucket engagement with the ground, smart delineators may be provided that are based on pressure or force sensors. For example, the amount of force or pressure in the hydraulic system may be converted to a ground pressure based on geometries of the hydraulic system and the bucket and a ground plane may be colored varying colors to depict the amount of down pressure being used. In one or more other embodiments, the bucket itself may be colored, the hydraulic cylinders in the image may be colored, or a graphical "down pressure" arrow may be used that varies in size as down pressure increase and/or that flashes as down pressure reaches a pre-determined maximum. In one or more embodiments, the soil type and/or ground material may be input into the system and the down pressure range may be adjusted based on the material being handled or worked on.

The operator assist module 122 may be used to implement smart feature delineators for a variety of conditions. For example, obstructions or obstacles at or near the work machine may be augmented with lines, shading, or other overlays and the overlays may be active overlays such that the relative risk of encountering the obstacles, or the degree to which something is engaged, is presented to the operator by the boldness of the overlay, flashing, color changes, or other active notifications. In any one or more of the above embodiments, the feature delineator may include sound notifications as well.

It is to be appreciated that in the context of remote control of work machines, the present application is advantageous in replacing some of the perceptions that may have been present when the operator was present in the work machine 100 and that may not be present when operating a work machine 100 remotely. In the case of loading a dump truck, the operators ability to move around, lean forward, and or otherwise change his/her point of view when approaching a dump truck may have allowed an onsite operator to more suitably approach and load a dump truck without encountering the top rail. The operator may also have had an easier time evenly spreading the load in the dump truck. With the given feature delineator and/or smart feature delineator, a remote operator may have the ability to perform more suitably without encountering the dump truck and by evenly spreading the load in the truck.

Similarly, in the case of scooping dirt from a pile, an in-cab operator may be able to move around, lean forward, and continually change his/her point of view of the dirt pile to help to identify the toe. Using the present feature delineator and/or smart delineator, a remote operator may more suitably maintain the bucket off of the ground until the work machine is about to engage the pile, where the bucket may be lowered to the ground. In addition, the operator may lower the bucket ahead of reaching the dirt pile to smooth the area in front of the dirt pile and may have an indication of how much down pressure is being applied. Once the pile is engaged, the operator may have an indication of how much the force or power is being exerted to engage the pile providing the operator with a better ability to know when to stop engaging the pile.

Still further, an in-cab operator attempting to travel with the bucket just above the ground may be able to listen to and feel the machine when travelling to know if the bucket is engaging the ground. With the present system, an operator may rely on the feature delineator or the smart feature delineator to assist with knowing where the bucket is relative to the ground as the machine travels.

Still further, back dragging operations may include force indications, which may allow a remote operator to better understand and appreciate how much force is being applied to the ground by bucket. This may allow an operator to avoid damaging the ground during this operation.

INDUSTRIAL APPLICABILITY

In operation and use, a user may operate a work machine, such as a wheel loader, from a remote control location. The user may perform a method of operating a work machine 200, which may include operating the work machine from an onsite remote control station where some level of direct visual feedback is present or offsite where direct visual feedback is not available. The method may include relying on visual, auditory, or tactile displays or features to see what the work machine is doing and what the relationships are between the work machine and the surrounding environment 204. The method may also include manipulating controls at the remote control station based, at least in part, on the displays or features 206. In one or more embodiments, the method may also include relying on feature delineators on the displays to control the equipment 208, and/or relying on smart feature delineators that change as the relationship between the work machine and the features change 210. Based on these controls, the remote control station may transmit signals to the work machine 212 and the remote operations equipment on the work machine may control the work machine 214. This may include operating the positional controls of the machine to move the machine and this may include operating the one or more implements of the machine. For example, in the case of a wheel loader, it may include raising and lowering and/or tipping the bucket, for example.

During operation of the machine, remote operations equipment on the machine may capture information regarding the surrounding environment of the machine or the exertion of the machine and may transmit the information to the remote control station to allow the operator to control the machine. The system may include an operator assist module on the work machine or at the remote control station that may augment the information captured by the remote operations equipment to assist the operator in better understanding the environment of the work machine. In one or more embodiments, a method of assisting remote operation of a work machine 300 may include capturing spatial, auditory, tactile, pressure, or three data at a work machine 302 and transmitting the data to a remote control station 304. The method may also include identifying a particular feature in the imagery captured by the remote operations equipment 306 and augmenting the spatial data with a feature delineator 308. In one or more embodiments, the feature may be a truck rail, a toe of a dirt pile, the surface of the ground, an obstruction, or another feature of the work machine environment. In one or more embodiments, the feature delineator may include a line, an outline, a shape, a symbol, or another type of delineator. In one or more embodiments, the operator assist module may augment the feature with a smart delineator 310. For example, the delineator may change as the relationship between the work machine and the feature changes 312. In one or more embodiments, the delineator may become more pronounced as a feature is approached 314. In one or more embodiments, the delineator may flash 316 or change colors 318, as the feature is approached. In still other embodiments, the delineator may change size 320 as in the case of a shadow of the bucket, for example. Still other changes to the delineator to provide a smart or active feature delineator may be provided. Moreover, the changing delineator may reflect other condition changes other than approaching the feature in the environment. That is, for example, the amount of engagement with the surrounding environment such as the amount of force or pressure being applied may be delineated with a smart delineator that changes as the force or pressure increases or decreases.

The present method of assisting remote operation of a work machine and the associated method of operation may be advantageous in providing a higher level of perceptibility for a remote operator than may otherwise be available. That is, the feature delineators and/or the smart feature delineators may provide the operator with a better sense of the relative positions or amounts of engagement of the features and the work machine or parts of the work machine. The operator may, thus, have a better ability to suitably control the equipment to more efficiently and suitably perform machine operations as well as avoid damaging surrounding equipment, obstacles, or other items.

The above detailed description is intended to be illustrative, and not restrictive. The scope of the disclosure should, therefore, be determined with references to the appended claims, along with the full scope of equivalents to which such claims are entitled.

What is claimed is:

1. A system for assisting remote operation of a work machine, the system comprising:
   a work machine;
   remote operations equipment arranged on the work machine and configured to capture information about the environment of the work machine and transmit the information to a remote control station;
   a remote control station configured to display images of the environment of the work machine; and
   an operator assist module configured for augmenting the information with a feature delineator, wherein the feature delineator delineates a feature of the information by overlaying the feature with a shape or symbol and the feature delineator is a smart feature delineator that changes as the relationship between the work machine and the feature changes.

2. The system of claim 1, wherein the feature delineator is a shape and the shape follows the contours of the feature.

3. The system of claim 1, wherein the shape or symbol is a line.

4. The system of claim 1, wherein the feature delineator comprises a line delineating a top rail of a dump truck.

5. The system of claim 1, wherein the feature delineator comprises a curvilinear line delineating a toe of a dirt pile.

6. The system of claim 1, wherein the feature delineator comprises a shape delineating a ground surface below a bucket of the work machine.

7. The system of claim 1, wherein the smart feature delineator changes color as the work machine approaches another piece of equipment.

8. The system of claim 7, wherein the smart feature delineator changes color from green, to yellow, to red.

9. The system of claim 1, wherein the smart feature delineator comprises a shape configured to identify a plane of a ground surface below a bucket of the work machine.

10. The system of claim 9, wherein the shape is large when the bucket is relatively high above the ground surface and small when the bucket is relatively close to the ground surface.

11. The system of claim 1, wherein the smart feature delineator changes as machine exertion changes.

12. A method of assisting remote operation of a work machine, comprising:
    receiving imagery and data relating to the environment of the work machine;
    identifying a feature in the imagery;
    augmenting the imagery with a feature delineator delineating the feature, wherein augmenting the imagery comprises overlaying the feature with a smart delineator in the form of a shape or symbol; and
    causing the smart delineator to change as the relationship between the work machine and the feature changes.

13. The method of claim 12, wherein the shape is a line.

14. The method of claim 13, wherein the line overlays the feature.

15. The method of claim 12, wherein the shape is configured to identify a plane of a ground surface below the work machine.

16. A method of operating a work machine, comprising:
    operating the work machine from a remote control station;
    relying on visual displays to understand relationships between the work machine and a surrounding environment;
    manipulating controls at the remote control station based, at least in part, on the visual displays; and
    relying on a feature delineator on the displays that delineates a feature of the surrounding environment to control the equipment, wherein the feature delineator delineates a feature of the information by overlaying the feature with a shape or symbol and the feature delineator is a smart feature delineator that changes as the relationship between the work machine and the feature changes.

* * * * *